H. G. HAASE.
UNIVERSAL ANGLE COUPLING AND VALVE SEAT FOR PIPING.
APPLICATION FILED FEB. 16, 1911.
1,031,642.
Patented July 2, 1912.
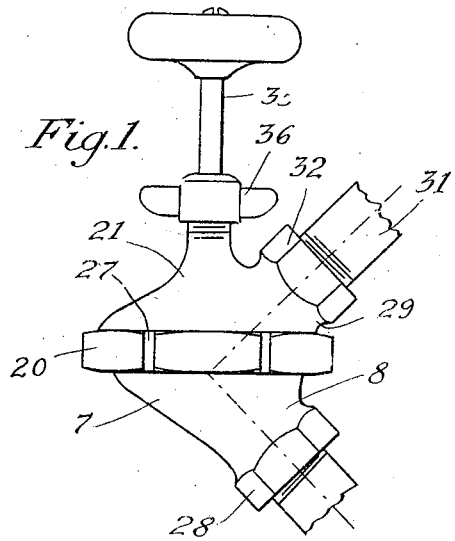
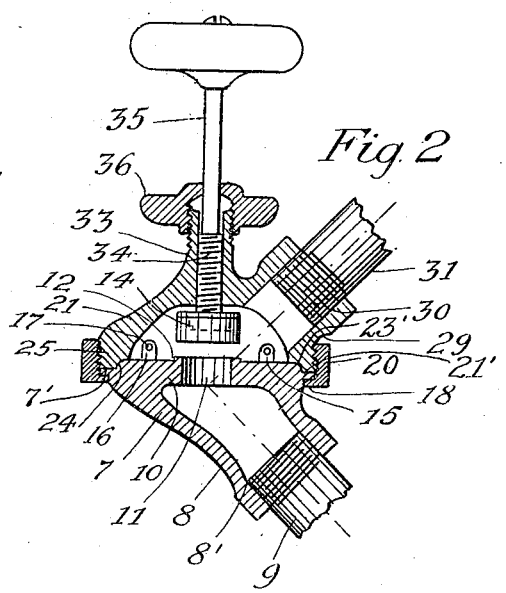
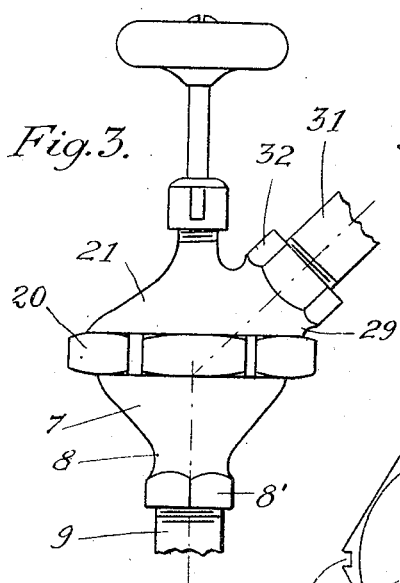
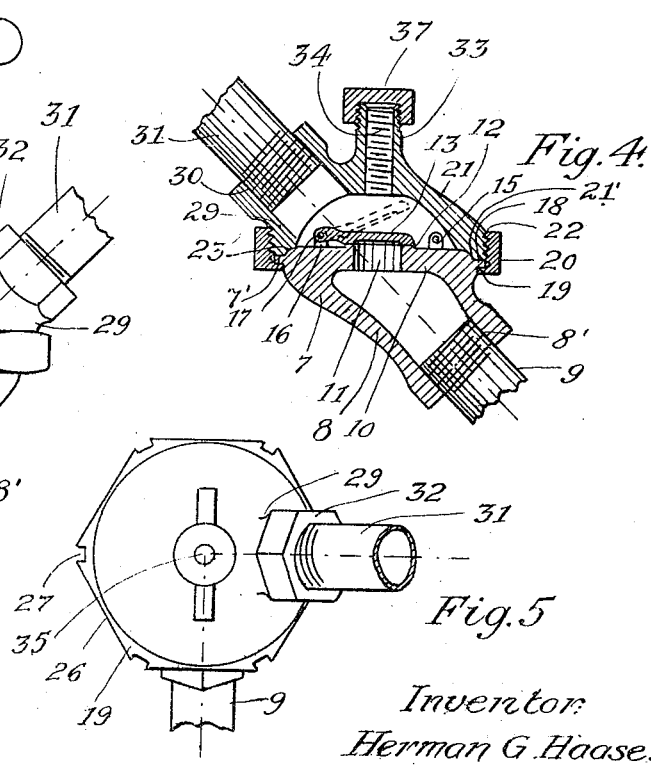
Inventor:
Herman G. Haase.
By F. A. Whiteley
his Attorney.

UNITED STATES PATENT OFFICE.

HERMAN G. HAASE, OF MINNEAPOLIS, MINNESOTA.

UNIVERSAL ANGLE-COUPLING AND VALVE-SEAT FOR PIPING.

1,031,642.   Specification of Letters Patent.   Patented July 2, 1912.

Application filed February 16, 1911. Serial No. 609,028.

*To all whom it may concern:*

Be it known that I, HERMAN G. HAASE, a citizen of the United States, residing at Minneapolis, in the county of Hennepin and State of Minnesota, have invented certain new and useful Improvements in Universal Angle-Couplings and Valve-Seats for Piping, of which the following is a specification.

My invention relates to a universal coupling for use in connection with piping of every sort and provides means whereby said coupling may be utilized to form a union between two pipes extending in any relative angular direction from ninety to one hundred and eighty degrees (90° to 180°).

It is also an object of my invention to provide in such angle coupling means for coöperation either with a choke valve or check valve, as may be desired. Such an adaptation is rendered practicable by reason of the characteristic and novel features of my universal joint, which features will be described in detail in the specification and particularly pointed out in the claims.

In the drawings illustrating the application of my invention in one form,—Figure 1 is a side elevation of the device having a choke valve applied thereto and with the parts set at ninety degrees (90°). Fig. 2 is a similar view in section. Fig. 3 is an elevation showing the pipes at an obtuse angle to one another. Fig. 4 is a sectional view of the union with the pipes in line and the check valve substituted for the choke valve. Fig. 5 is a plan view from above of the parts shown in Fig. 1 with the valve wheel omitted.

My union comprises a pair of members 8 and 29, member 8 being provided with an interiorly threaded coupling extension, as indicated at 8', for forming a connection with a pipe 9 and member 29 being provided with a similar interiorly threaded coupling extension 30 for forming connection with pipe 31. Member 8 is provided with an expanded portion 7, said portion being formed with an annular face 7' surrounding said expanded portion and lying in a plane angularly disposed with respect to the axial center of opening 8' and pipe 9, the preferred angle, as shown, being forty-five degrees. In the form shown the face 7' is continued in the upwardly curved portion 24 hereinafter described and from there outwardly upon the surface of a diaphragm 10 which forms an integral part of member 8 and intersects said member at an angle of forty-five degrees to the axial center of coupling extension 8' and pipe 9, that is, so the face of said diaphragm will lie in a plane parallel to the plane of the face of the member. The member 29 is provided with an expanded portion 21 having an annular face 21', said face 21' being in the plane at an angle of forty-five degrees to the axial center of threaded coupling extension 30 and pipe 31. Face 21' has an upwardly curved portion forming a seat 23 corresponding with the portion 24 of face 7', the respective faces on expanded portions 7 and 21 being adapted to coöperate in any relative position thereof to form a tight union.

The diaphragm 10 is provided centrally thereof with a suitable opening 11, said opening being provided at the top with an integral ring or flange 12 forming a seat for a check valve 13, as shown in Fig. 4, or a choke valve 14, as shown in Fig. 2. Sets of lugs 15 and 16, respectively, to which the check valve 13 may be pivoted, as at 17, when desired, are provided on the web 10, but it is to be understood that neither the check valve nor the choke valve will necessarily have to be used with my device, which may be used merely for the purpose of forming angle unions, as desired.

The member 7 is provided with an annular outwardly extending flange 18 in the plane of the web 10 adapted to coöperate with an inwardly extending annular flange 19 on the interiorly threaded coupling ring 20 by means of which an upper member 21 is secured to the base member 7, said upper member being provided with threaded annular surface 22 for that p‍ ‍ose and also with a milled seat 23 adapted to coöperate with a curved portion 24 extending around the top of the web 10 the surface of said curved portion being correspondingly milled so as to enter exactly into and coincide with the surface of the seat 23. If desired, a packing ring may be used between the flange 18 and the coöperating face 25 of the member 21, but if the coöperating members are properly milled a tight union will be effected without the use of any packing material, or at most a little graphite or similar substance. The ring 20 is shown as being provided with faces 26 and notches 27 to adapt the same to the use of plumbing tools of ordinary construction. The contracted portion 8 of the base 7 is also hexagonally formed with faces 28 for the same purpose.

Centrally disposed on the member 21 a second diminished extension 33 may be provided having a threaded opening 34 for receiving a correspondingly threaded portion of the valve stem 35 carrying the choke valve 14 in the usual way, said valve being secured upon the extension 33 by means of a hand nut 36. In case it is desired to dispense with the choke valve, either to use the check valve 13 or to use the union without any valve, the valve stem 35 may readily be removed and the opening 34 be closed by a cap 37, as shown in Fig. 4.

The simplicity and practical value of my universal angle union will be apparent. Through its use any form of offset in which the pipes make any desired or necessary angle not less than ninety degrees (90°) can readily be effected. It can be used either with or without the choke valve or the check valve, but it is an especial feature of my invention that it provides a seat for either of said valves capable of use in a straight run of pipe. It is also a feature of my invention that the parts of the valve, both stem and seat, are rendered easily accessible for the purpose of truing the surfaces thereof or remedying other defects.

I claim:

1. A universal pipe fitting comprising two members, each of said members being provided with an expanded portion having an annular face, said faces being adapted to coöperate in any relative position thereof to form a union, a coupling extension formed on each member at an angle of forty-five degrees (45°) with the plane of the face on said member, a diaphragm forming an integral part of one member having its face parallel with the plane of the face of said member and having therein a centrally disposed opening, an integral valve seat surrounding said opening and extended outwardly therefrom toward said other member, means on said diaphragm adapted to pivotally connect a check valve therewith to coöperate with said valve seat, and means to secure said faces in adjustable coöperative relation.

2. A universal pipe fitting comprising two members, each of said members being provided with an expanded portion having an annular face, said faces being adapted to coöperate in any relative position thereof to form a union, a coupling extension formed on each member at an angle to the plane of the face on said member, a diaphragm forming an integral part of one member having its face parallel with the plane of the face of said member and having therein a centrally disposed opening, a valve seat surrounding said opening and extended outwardly therefrom toward said other member, means on said diaphragm adapted to pivotally connect a check valve therewith for coöperation with said valve seat, and means carried by the other member for securing a choke valve in position to coöperate with said valve seat.

3. A universal pipe fitting comprising two members, each of said members being provided with an expanded portion having an annular face, said faces being adapted to coöperate in any relative position thereof to form a union, a coupling extension formed on each member at an angle to the plane of the face on said member, a diaphragm forming an integral part of one member having its face parallel with the plane of the face of said member and having therein a centrally disposed opening, an integral valve seat surrounding said opening and extended outwardly therefrom toward said other member, means on said diaphragm at each side of said opening adapted to pivotally connect a check valve therewith to coöperate with said valve seat when the coupling extensions form either a straight run or a right-angled bend.

In testimony whereof I have affixed my signature in presence of two witnesses.

HERMAN G. HAASE.

Witnesses:
F. A. WHITELEY,
H. A. BOWMAN.